(12) United States Patent
Ahn

(10) Patent No.: US 8,896,797 B2
(45) Date of Patent: Nov. 25, 2014

(54) LIQUID CRYSTAL DISPLAY PANEL COMPRISING FIRST AND SECOND SUB-PIXEL ELECTRODES AND INCLUDING A CONTACT ELECTRODE AND A CONNECTION ELECTRODE THAT COUPLES THE SECOND SUB-PIXEL AND CONTACT ELECTRODES

(75) Inventor: Hyeong-Cheol Ahn, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 439 days.

(21) Appl. No.: 13/046,602

(22) Filed: Mar. 11, 2011

(65) Prior Publication Data

US 2012/0038845 A1 Feb. 16, 2012

(30) Foreign Application Priority Data

Aug. 10, 2010 (KR) .................. 10-2010-0076966

(51) Int. Cl.
*G02F 1/1343* (2006.01)
*G02F 1/139* (2006.01)

(52) U.S. Cl.
CPC .............. *G02F 1/134336* (2013.01); *G02F 2001/134345* (2013.01); *G02F 2203/30* (2013.01); *G02F 1/1393* (2013.01)
USPC .......................................... 349/144; 349/38

(58) Field of Classification Search
CPC .............. G02F 1/136204; G02F 1/134336; G02F 1/134309; G02F 2001/134345
USPC ........................... 349/38, 39, 140, 143, 144
See application file for complete search history.

(56) References Cited

U.S. PATENT DOCUMENTS

| | | | |
|---|---|---|---|
| 2006/0038931 A1* | 2/2006 | Na | 349/42 |
| 2007/0182902 A1* | 8/2007 | Chung et al. | 349/129 |
| 2008/0088783 A1* | 4/2008 | Tai et al. | 349/129 |
| 2008/0121893 A1* | 5/2008 | Kim et al. | 257/72 |
| 2008/0303965 A1 | 12/2008 | Kim | |
| 2009/0135342 A1* | 5/2009 | Lee | 349/96 |
| 2009/0237579 A1 | 9/2009 | Shin et al. | |

FOREIGN PATENT DOCUMENTS

KR 10-2007-0082412 A 8/2007

* cited by examiner

*Primary Examiner* — Paul Lee
(74) *Attorney, Agent, or Firm* — Christie, Parker & Hale, LLP

(57) ABSTRACT

A liquid crystal display panel having improved lateral visibility. The liquid crystal display panel includes a first substrate including a pixel electrode formed on a pixel area including a first sub-pixel area and a second sub-pixel area; and a second substrate coupled to the first substrate with a liquid crystal layer accommodated between the first substrate and the second substrate, and including a common electrode formed on an area corresponding to the pixel area, wherein the pixel electrode includes a first sub-pixel electrode formed on the first sub-pixel area; a second sub-pixel electrode formed on the second sub-pixel area; and a contact electrode formed between the first sub-pixel area and the second sub-pixel area, and wherein the first sub-pixel electrode and the contact electrode are spaced apart from each other by a predetermined distance.

9 Claims, 3 Drawing Sheets

LIQUID CRYSTAL DISPLAY PANEL COMPRISING FIRST AND SECOND SUB-PIXEL ELECTRODES AND INCLUDING A CONTACT ELECTRODE AND A CONNECTION ELECTRODE THAT COUPLES THE SECOND SUB-PIXEL AND CONTACT ELECTRODES

CROSS-REFERENCE TO RELATED PATENT APPLICATION

This application claims the benefit of Korean Patent Application No. 10-2010-0076966, filed on Aug. 10, 2010, in the Korean Intellectual Property Office, the disclosure of which is incorporated herein in its entirety by reference.

BACKGROUND OF THE INVENTION

1. Field of the Invention

One or more aspects of the present invention relate to liquid crystal display panels, and more particularly, to liquid crystal display panels having improved lateral visibility.

2. Description of the Related Art

In general, a liquid crystal display panel includes an array substrate, a color filter substrate facing the array substrate, and a liquid crystal layer formed between the array substrate and the color filter substrate. The array substrate includes a plurality of pixels that are elementary units for realizing an image. Each pixel includes a gate wiring, a data wiring, a thin-film transistor (TFT), and a pixel electrode. The gate wiring and the data wiring receive a gate signal and a data signal, respectively, and are electrically coupled to gate and source electrodes of the TFT, respectively. The pixel electrode is electrically coupled to a drain electrode of the TFT, and faces a common electrode formed on the color filter substrate, with the liquid crystal layer interposed between the common electrode and the pixel electrode.

In comparison with a cathode ray tube (CRT) display device, a liquid crystal display device including a liquid crystal display panel may be thinner, but may have a narrower view angle.

In order to overcome the narrower view angle issue, recently, active research has been conducted into liquid crystal display devices having wide view angles, such as patterned vertical alignment (PVA) mode, multi-domain patterned vertical alignment (M-PVA) mode, and super-patterned vertical alignment (S-PVA) mode liquid crystal display devices. These liquid crystal display devices are manufactured by forming a liquid crystal domain in which liquid crystal molecules are arranged in different directions with a patterned transparent electrode, and thus may have wider view angles.

SUMMARY OF THE INVENTION

One or more aspects of the present invention provide liquid crystal display panels having improved lateral visibility.

According to an aspect of the present invention, a liquid crystal display panel includes a first substrate including a pixel electrode on a pixel area including a first sub-pixel area and a second sub-pixel area; and a second substrate coupled to the first substrate with a liquid crystal layer accommodated between the first substrate and the second substrate, and including a common electrode formed on an area corresponding to the pixel area, wherein the pixel electrode includes a first sub-pixel electrode on the first sub-pixel area; a second sub-pixel electrode on the second sub-pixel area; and a contact electrode between the first sub-pixel area and the second sub-pixel area, and wherein the first sub-pixel electrode and the contact electrode are spaced apart from each other by a predetermined distance.

The first substrate may further include a gate electrode; a semiconductor layer insulated from the gate electrode; and a source electrode and a drain electrode that are electrically coupled to the semiconductor layer, and wherein the drain electrode extends to the first sub-pixel area.

The liquid crystal display panel may further include a passivation layer between the pixel electrode and the drain electrode.

A coupling capacitor may be formed by the first sub-pixel electrode, the passivation layer, and the drain electrode extending to the first sub-pixel area.

The liquid crystal display panel may further include a storage wiring that is formed so as to overlap the pixel electrode.

A storage capacitor may be formed by the storage wiring, the passivation layer, and the contact electrode.

The first sub-pixel electrode may be a floating electrode.

A first opening may be formed in at least a portion of the common electrode so as to correspond to the first sub-pixel electrode.

The first substrate may further include a drain electrode extending to the first sub-pixel area; and a passivation layer between the pixel electrode and the drain electrode, wherein a coupling capacitor is formed by a region of the first sub-pixel electrode in which the first opening is formed, the passivation layer, and the drain electrode.

The liquid crystal display panel may further include a connection electrode for coupling the second sub-pixel electrode and the contact electrode to each other.

According to another aspect of the present invention, a liquid crystal display panel including a switching device formed on a first substrate and including a source electrode, a drain electrode, and a gate electrode; a first sub-pixel area that is electrically coupled to the switching device and includes a first liquid crystal capacitor and a coupling capacitor; and a second sub-pixel area that is electrically coupled to the switching device and includes a second liquid crystal capacitor, wherein a voltage charging the first sub-pixel area is smaller than a voltage charging the second sub-pixel area.

The coupling capacitor may be coupled in series between the drain electrode and the first liquid crystal capacitor.

The liquid crystal display panel may further include a storage capacitor formed between the first sub-pixel area and the second sub-pixel area.

The liquid crystal display panel may further include a data wiring that is electrically coupled to the source electrode; a gate wiring that is electrically coupled to the gate electrode; and a storage wiring that is electrically coupled to one terminal of the storage capacitor and extends substantially in parallel to a direction in which the gate wiring extends.

The liquid crystal display panel may further include a second substrate facing the first substrate, wherein a common electrode is formed on the second substrate.

A first opening may be formed in a region of the common electrode in which the first opening is formed.

The liquid crystal display panel may further include a first sub-pixel electrode formed on the first sub-pixel area; a second sub-pixel electrode formed on the second sub-pixel area; and a contact electrode formed between the first sub-pixel area and the second sub-pixel area, wherein the first sub-pixel electrode and the contact electrode are spaced apart from each other by a predetermined distance.

The liquid crystal display panel may further include a passivation layer between the first sub-pixel electrode and the drain electrode, wherein the drain electrode extends to the first sub-pixel area, and wherein a coupling capacitor is formed between the first sub-pixel electrode, the passivation layer, and a drain electrode extending in the first sub-pixel area.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
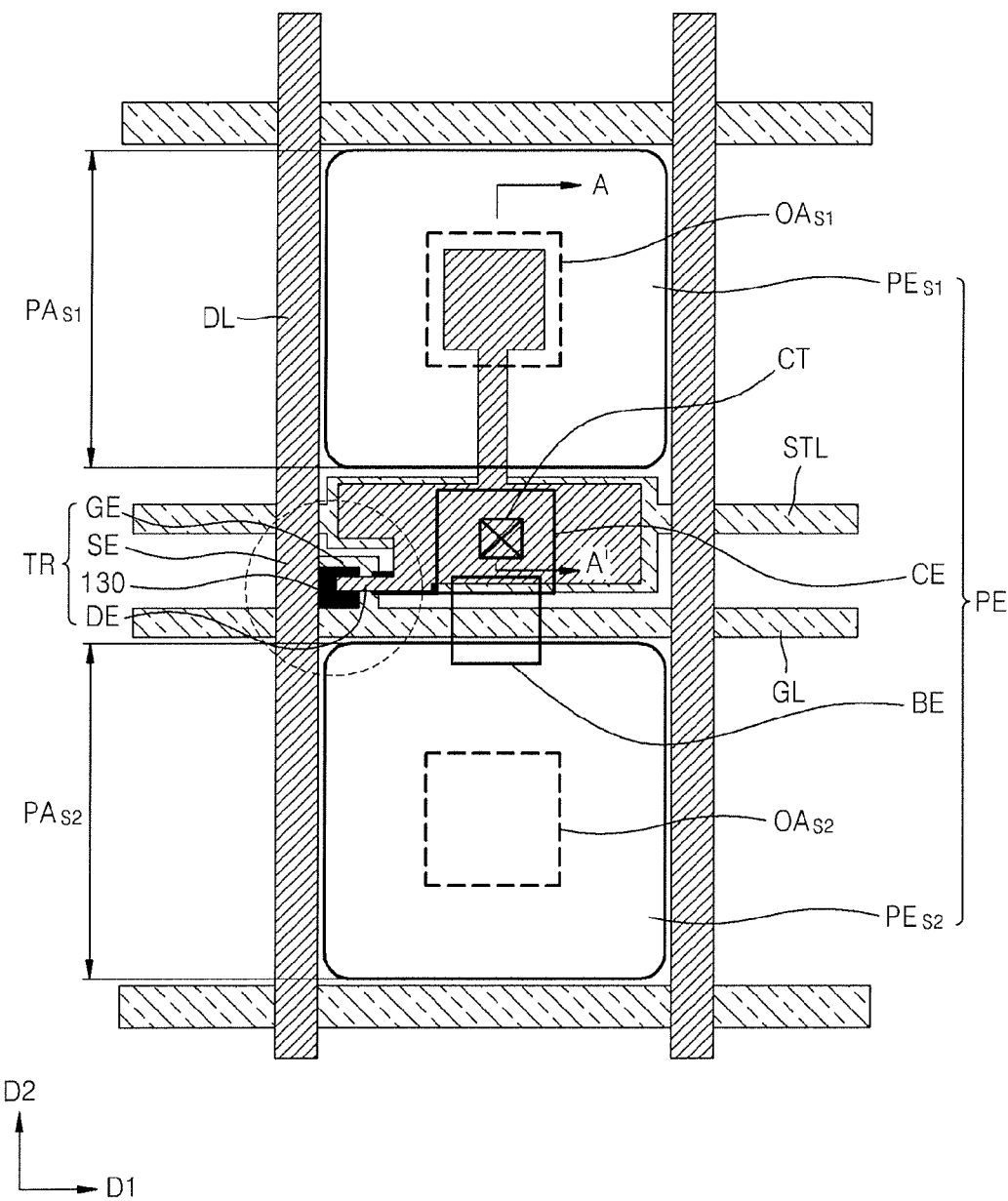
FIG. 1 is a plan view of a liquid crystal display panel according to an embodiment of the present invention.
Figure 2:
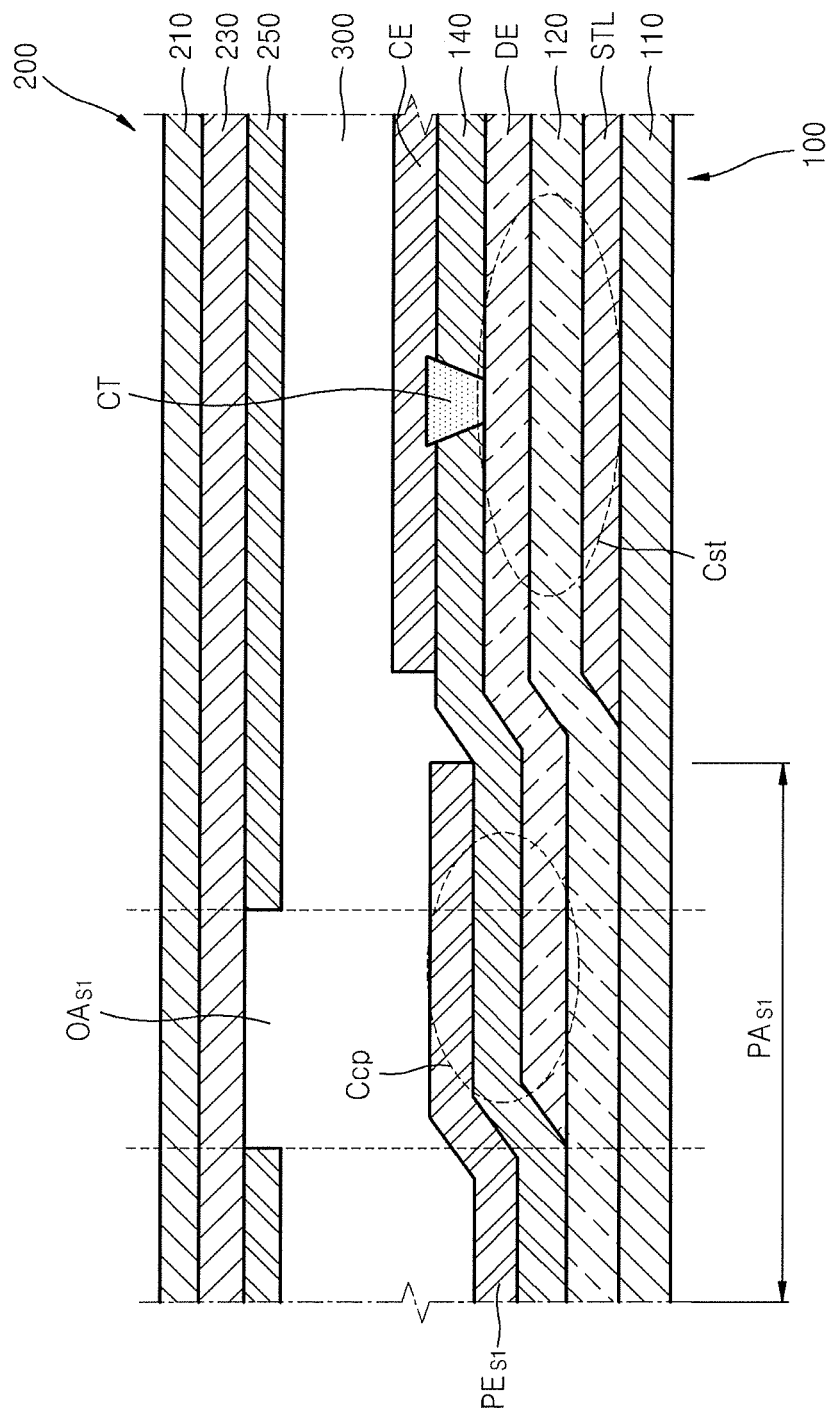
FIG. 2 is a cross sectional view of the liquid crystal display panel taken along a line A-A' of FIG. 1

FIG. 1 is a plan view of a liquid crystal display panel according to an embodiment of the present invention. FIG. 2 is a cross sectional view of the liquid crystal display panel taken along a line A-A' of FIG. 1.

Referring to FIGS. 1 and 2, the liquid crystal display panel according to the present embodiment includes a first substrate 100, and a second substrate 200 coupled to the first substrate 100 with a liquid crystal layer 300 accommodated between the first substrate 100 and the second substrate 200.

The first substrate 100 includes a first base substrate 110 including a pixel area PA defined as a portion thereof. In this case, the pixel area PA includes a first sub-pixel area $PA_{s1}$ and a second sub-pixel area $PA_{s2}$ that are separated from each other.

Gate wirings GL, and data wirings DL intersecting the gate wirings GL are formed on the first base substrate 110.

A switching device TR connected to each gate wiring GL and each data wiring DL, and a pixel electrode PE connected to the switching device TR are formed on the pixel area PA. In addition, a storage wiring STL is formed on the pixel area PA so as to partially overlap the pixel electrode PE.

The switching device TR includes a gate electrode GE, a gate insulating layer 120 (FIG. 2), a semiconductor layer 130, a source electrode SE, and a drain electrode DE. The gate electrode GE protrudes from the gate wiring GL. The gate insulating layer 120 is formed on the gate wiring GL and the gate electrode GE, as shown in FIG. 2. The semiconductor layer 130 includes an active layer doped with impurities, and an ohmic contact layer formed on the active layer. In this case, the semiconductor layer 130 is formed on the gate insulating layer 120 so as to correspond to the gate electrode GE. The source electrode SE protrudes from the data wiring DL, and is formed on the semiconductor layer 130. The drain electrode DE is spaced apart from the source electrode SE, and is formed on the semiconductor layer 130.

A contact portion CT is formed in an extension portion of the drain electrode DE, and the drain electrode DE and a contact electrode CE of the pixel electrode PE, which will be described below, are electrically connected to each other through the contact portion CT. As shown in FIG. 2, the contact portion CT includes a contact hole formed in a passivation layer 140 that is formed on the data wiring DL, the source electrode SE, and the drain electrode DE. In this case, the source electrode SE and the drain electrode DE may each include a conductive material such as a metal material, an indium tin oxide (ITO), or an indium zinc oxide (IZO).

The pixel electrode PE includes a first sub-pixel electrode $PE_{s1}$, a second sub-pixel electrode $PE_{s2}$, the contact electrode CE, and a connection electrode BE. The first sub-pixel electrode $PE_{s1}$ is formed on the first sub-pixel area $PA_{s1}$, and the second sub-pixel electrode $PE_{s2}$ is formed on the second sub-pixel area $PA_{s2}$. In this case, the first sub-pixel electrode $PE_{s1}$ may be a floating type electrode that is spaced apart from the second sub-pixel electrode $PE_{s2}$, the contact electrode CE, and the connection electrode BE by a predetermined distance.

The contact electrode CE is formed between the first and second sub-pixel electrodes $PE_{s1}$ and $PE_{s2}$, and the connection electrode BE is formed between the second sub-pixel electrode $PE_{s2}$ and the contact electrode CE. In addition, the switching device TR is formed adjacent to the contact electrode CE to be electrically coupled to the contact electrode CE through the contact portion CT.

The storage wiring STL is formed on a region between the first sub-pixel area $PA_{s1}$ and the second sub-pixel area $PA_{s2}$, that is, on a region adjacent to the switching device TR. The storage wiring STL is formed to overlap the contact electrode CE, as shown in FIG. 1.

As shown in FIG. 2, the second substrate 200 includes a second base substrate 210 including the pixel area PA that is defined as a portion thereof and includes the first and second sub-pixel areas $PA_{s1}$ and $PA_{s2}$. A light-shielding layer (not shown), a color filter layer 230, a first over coating layer (not shown), and a common electrode 250 are formed on the second base substrate 210.

The light-shielding layer is formed of a conductive material, and corresponds to the gate wiring GL and the data wiring DL so as to shield light. Alternatively, the light-shielding layer may be formed so as to correspond to the gate wiring GL, the data wiring DL, the switching device TR, and the storage wiring STL. The light-shielding layer has a bi-layer structure including a chrome (Cr) layer and a chrome oxide (CrOx) layer.

The color filter layer 230 is formed on the pixel area PA, and for example, is formed on a portion of the pixel area PA defined by the light-shielding layer.

The common electrode 250 is formed on the color filter layer 230. That is, the common electrode 250 is commonly formed on the pixel electrode PE (i.e., the first and second sub-pixel electrodes $PE_{s1}$ and $PE_{s2}$), the contact electrode CE, and the connection electrode BE, which are formed on the pixel area PA, and a common voltage Vcom is applied to the common electrode 250. The common electrode 250 is commonly connected to other common electrodes formed on other pixel areas that are adjacent to the pixel area PA.

The first and second sub-pixel areas $PA_{s1}$ and $PA_{s2}$ of the common electrode 250 are partially removed to form a predetermined opening. That is, a first opening $OA_{s1}$ corresponding to the first sub-pixel area $PA_{s1}$, and a second opening $OA_{s2}$ corresponding to the second sub-pixel area $PA_{s2}$ are formed in the common electrode 250, as shown in FIG. 2. For example, the first opening $OA_{s1}$ may be formed to correspond to a central portion of the first sub-pixel area $PA_{s1}$, and the second opening $OA_{s2}$ may be formed to correspond to a central portion of the second sub-pixel area $PA_{s2}$.

In this case, a first liquid crystal capacitor $Cl_{c1}$ (refer to FIG. 3) is defined by the first sub-pixel electrode $PE_{s1}$, a liquid crystal layer 300 and the common electrode 250, and a second liquid crystal capacitor $Cl_{c2}$ (refer to FIG. 3) is defined by the second sub-pixel electrode $PE_{s2}$, the liquid crystal layer 300 and the common electrode 250. A storage capacitor Cst is defined by the gate insulating layer 120, the drain electrode DE and the passivation layer 140 that are formed between the storage wiring STL and the contact electrode CE. In addition, a coupling capacitor Ccp is defined by the first sub-pixel electrode $PE_{s1}$, the passivation layer 140, and the drain electrode DE. In this case, a region of the drain electrode DE used for forming the storage capacitor Cst and the coupling capacitor Ccp may have a predetermined area on a D1-D2 plane. Likewise, by forming the coupling capacitor Ccp in the first and second openings $OA_{s1}$ and $OA_{s2}$ of the common electrode 250, which are dead spaces, the liquid crystal display panel according to the present embodiment may have improved aperture ratio and lateral visibility, which will be described hereinafter.

As described in the Description of the Related Art, active research has been conducted into multi-domain patterned vertical alignment (M-PVA) mode liquid crystal display panels having excellent top, bottom, right, and left view angles. However, in such an M-PVA mode liquid crystal display panel, due to extreme gamma variation, gray distortion occurs around lateral portions of the liquid crystal display panel to cause a color shift issue, thereby reducing lateral visibility. In order to prevent the color shift issue, research has been conductive into methods of dividing a single pixel into two or more sub-pixels, and applying different gray voltages to the respective sub-pixels to mix dual gray levels in a single pixel. However, when these methods are used, the aperture ratio may be reduced, and manufacturing costs may be increased.

From this point of view, in the liquid crystal display panel according to the present embodiment, capacitors are formed in openings of a pixel electrode, thereby improving lateral visibility without reducing an aperture ratio.

That is, as shown in FIGS. 1 and 2, the liquid crystal display panel is configured so that two sub-pixel areas $PA_{s1}$ and $PA_{s2}$ may be disposed within a single pixel area PA. In addition, the first and second openings $OA_{s1}$ and $OA_{s2}$ for forming domains are formed in the first and second sub-pixel areas $PA_{s1}$ and $PA_{s2}$, respectively. In this case, in the liquid crystal display panel according to the present embodiment, the pixel electrode PE includes first sub-pixel electrode $PE_{s1}$, the second sub-pixel electrode $PE_{s2}$, the contact electrode CE and the connection electrode BE, and the first sub-pixel electrode $PE_{s1}$ and the contact electrode CE are separated from each other. Thus, the coupling capacitor Ccp for allowing different voltages to be applied to respective sub-pixels may be formed in a region corresponding to the first opening $OA_{s1}$ of the first sub-pixel area $PA_{s1}$.

That is, the drain electrode DE used to form the storage capacitor Cst extends to the first opening $OA_{s1}$ of the first sub-pixel area $PA_{s1}$ to function as a data bridge. While the coupling capacitor Ccp is formed by the drain electrode DE, the first sub-pixel electrode $PE_{s1}$, and the passivation layer 140 are interposed therebetween. A liquid crystal voltage that is reduced by as much as a voltage applied to the coupling capacitor Ccp is applied to the first sub-pixel area $PA_{s1}$ via the first sub-pixel electrode $PE_{s1}$. On the other hand, similar to a general structure, the connection electrode BE formed of an indium tin oxide (ITO) functions as a data bridge in the second sub-pixel area $PA_{s2}$, and the storage capacitor Cst and the second sub-pixel electrode $PE_{s2}$ are connected to each other. In this case, the common electrode 250 is formed on an entire surface of the pixel area PA, regardless of the first sub-pixel area $PA_{s1}$ and the second sub-pixel area $PA_{s2}$, but the pixel electrode PE is divided so as to correspond to the first sub-pixel area $PA_{s1}$ and the second sub-pixel area $PA_{s2}$.

In this case, the capacity of the coupling capacitor Ccp may be controlled by the thickness of the passivation layer 140 and the area of the drain electrode DE functioning as a data bridge.

By forming the coupling capacitor Ccp in the first opening $OA_{s1}$, that is a dead space, in series to a pixel voltage, a loss in an aperture ratio is minimized, and lateral visibility is compensated for, in the liquid crystal display panel according to the present embodiment.

Figure 3:
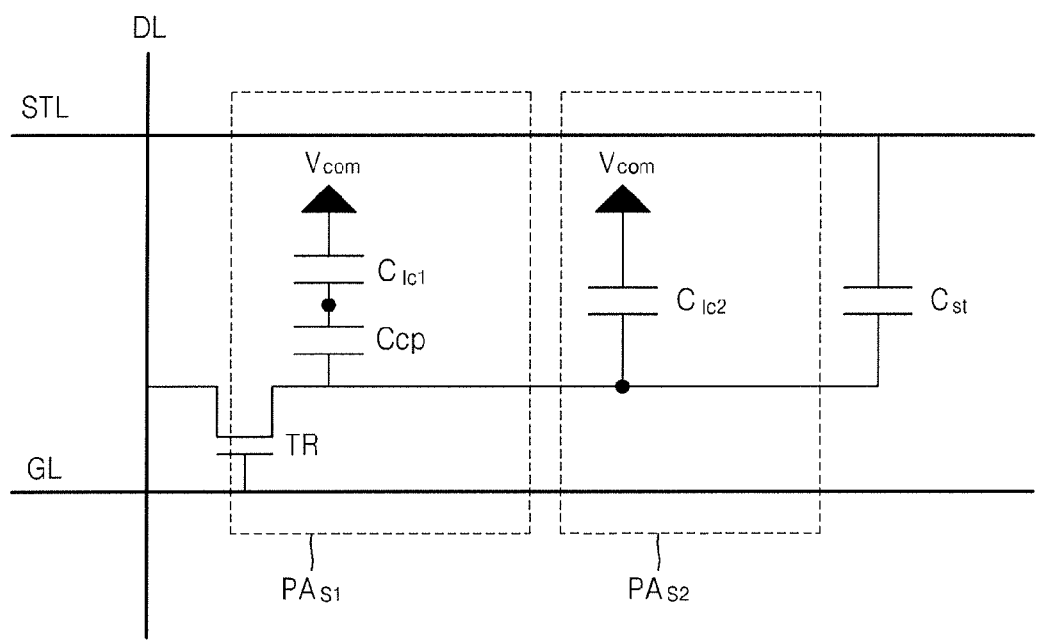
FIG. 3 is an equivalent circuit diagram of a single pixel of a liquid crystal display panel, according to an embodiment of the present invention.

FIG. 3 is an equivalent circuit diagram of a single pixel of a liquid crystal display panel, according to an embodiment of the present invention.

Referring to FIG. 3, a single pixel of the liquid crystal display panel includes the data wiring DL, the gate wiring GL, the storage wiring STL, the switching device TR, the first sub-pixel area $PA_{s1}$, the coupling capacitor Ccp, and the second sub-pixel area $PA_{s2}$.

A gate electrode of the switching device TR is electrically connected to the gate wiring GL, a source electrode of the switching device TR is electrically connected to the data wiring DL, and a drain electrode of the switching device TR is electrically connected to the first sub-pixel area $PA_{s1}$.

The first sub-pixel area $PA_{s1}$ includes the first liquid crystal capacitor $Cl_{c1}$ and the coupling capacitor Ccp. The coupling capacitor Ccp is disposed between the drain electrode of the switching device TR and the first liquid crystal capacitor $Cl_{c1}$. One terminal of the first liquid crystal capacitor $Cl_{c1}$ is electrically coupled to the coupling capacitor Ccp, and the other terminal is electrically coupled to the common electrode 250 (see FIG. 2) to which the common voltage Vcom is applied.

The second sub-pixel area $PA_{s2}$ includes the second liquid crystal capacitor $Cl_{c2}$ and the storage capacitor Cst. One terminal of the second liquid crystal capacitor $Cl_{c2}$ is electrically coupled to the drain electrode of the switching device TR, and the other terminal is electrically coupled to the common electrode 250 (see FIG. 2) to which the common voltage Vcom is applied. The storage capacitor Cst is coupled in parallel to the second liquid crystal capacitor $Cl_{c2}$. One terminal of the storage capacitor Cst is electrically connected to a terminal of the second liquid crystal capacitor $Cl_{c2}$, and the other terminal is electrically coupled to the storage wiring STL.

When a gate voltage is applied to the gate wiring GL, the switching device TR is turned on, and a data voltage applied to the data wiring DL is applied to the drain electrode. The data voltage applied to the drain electrode of the switching device TR charges the first sub-pixel area $PA_{s1}$ and the second sub-pixel area $PA_{s2}$. In this case, a voltage charging the first sub-pixel area $PA_{s1}$ through the coupling capacitor Ccp is smaller than a voltage charging the second sub-pixel area $PA_{s2}$. That is, a liquid crystal voltage that is reduced by as much as a voltage applied to the coupling capacitor Ccp is applied to the first sub-pixel area $PA_{s1}$.

Due to a difference between voltages applied to the first sub-pixel area $PA_{s1}$ and the second sub-pixel area $PA_{s2}$, a degree by which liquid crystal molecules formed between the first sub-pixel area $PA_{s1}$ and the common electrode 250 (see FIG. 2) lie is smaller than a degree by which liquid crystal molecules formed between the second sub-pixel area $PA_{s2}$ and the common electrode 250 (see FIG. 2) lie. Thus, the amount of light transmitted through the first sub-pixel area PAs1 and the amount of light transmitted through the second sub-pixel area PAs2 are combined, thereby improving lateral view angles while maintaining the brightness of a front portion of the liquid crystal display panel.

The lateral visibility of a liquid crystal display panel according to an embodiment of the present invention may be improved without a loss in an aperture ratio of a pixel area.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display panel comprising:
    a first substrate comprising a pixel electrode on a pixel area comprising a first sub-pixel area and a second sub-pixel area, the first sub-pixel area including a first opening; and
    a second substrate coupled to the first substrate with a liquid crystal layer accommodated between the first substrate and the second substrate, and comprising a common electrode formed on an area corresponding to the pixel area,
    wherein the pixel electrode comprises:
    a first sub-pixel electrode on the first sub-pixel area;
    a second sub-pixel electrode on the second sub-pixel area;
    a switching device between the first sub-pixel area and the second sub-pixel area including a gate electrode, a source electrode, and a drain electrode;
    a contact electrode on a non-pixel area between the first sub-pixel area and the second sub-pixel area, wherein the contact electrode is electrically connected to the drain electrode of the switching device via a contact portion formed in an extension portion of the drain electrode between the first sub-pixel area and the second sub-pixel area, wherein the drain electrode extends to the first opening of the first sub-pixel area to bridge data between the first sub-pixel area and the second sub-pixel area, and
        wherein the first sub-pixel electrode and the contact electrode are spaced apart from each other by a predetermined distance; and
    a connection electrode between the second sub-pixel electrode and the contact portion and not including the contact portion for electrically coupling the second sub-pixel electrode and the contact electrode to each other.

2. The liquid crystal display panel of claim 1, wherein the first substrate further comprises:
    a gate electrode;
    a semiconductor layer insulated from the gate electrode; and
    a source electrode and a drain electrode that are electrically coupled to the semiconductor layer, and
    wherein the drain electrode extends to the first sub-pixel area.

3. The liquid crystal display panel of claim 2, further comprising a passivation layer between the pixel electrode and the drain electrode.

4. The liquid crystal display panel of claim 3, further comprising a coupling capacitor formed by the first sub-pixel electrode, the passivation layer, and the drain electrode extending to the first sub-pixel area.

5. The liquid crystal display panel of claim 3, further comprising a storage wiring to overlap the pixel electrode.

6. The liquid crystal display panel of claim 5, further comprising a storage capacitor formed by the storage wiring, the passivation layer, and the contact electrode.

7. The liquid crystal display panel of claim 1, wherein the first sub-pixel electrode is a floating electrode.

8. The liquid crystal display panel of claim 1, wherein a first opening is formed in at least a portion of the common electrode to correspond to the first sub-pixel electrode.

9. The liquid crystal display panel of claim 8, wherein the first substrate further comprises:
    a drain electrode extending to the first sub-pixel area; and
    a passivation layer interposed between the pixel electrode and the drain electrode,
    wherein a coupling capacitor is formed by a region of the first sub-pixel electrode in which the first opening is formed, the passivation layer, and the drain electrode.

* * * * *